United States Patent [19]

Lowe

[11] Patent Number: 5,282,038

[45] Date of Patent: Jan. 25, 1994

[54] VIDEO SIGNAL PROCESSING SYSTEM ARCHITECTURE

[75] Inventor: Virgil L. Lowe, Roswell, Ga.

[73] Assignee: AVS Broadcast, Inc., Northvale, N.J.

[21] Appl. No.: 763,195

[22] Filed: Sep. 20, 1991

[30] Foreign Application Priority Data

Sep. 20, 1990 [GB] United Kingdom ............... 9020539

[51] Int. Cl.$^5$ ..................... H04N 5/262; H04N 5/268
[52] U.S. Cl. ..................................... 358/183; 358/181
[58] Field of Search ............... 358/183, 181, 185, 22; 340/721, 825.29; 395/162, 163, 154; H04N 5/262, 5/272, 5/268, 5/222

[56] References Cited

U.S. PATENT DOCUMENTS

| | | | |
|---|---|---|---|
| 4,694,344 | 9/1987 | Florg | 358/183 |
| 4,858,011 | 8/1989 | Jackson et al. | 358/185 |
| 4,947,254 | 8/1990 | Abt et al. | 358/181 |
| 5,001,473 | 3/1991 | Ritter et al. | 358/185 |
| 5,036,395 | 7/1991 | Reimers | 358/185 |

*Primary Examiner*—James J. Groody
*Assistant Examiner*—Glenton B. Burgess
*Attorney, Agent, or Firm*—Hopkins & Thomas

[57] ABSTRACT

An edit suite combines a vision mixer and digital video effects device. A routing matrix (100) is arranged on a back board and interconnected with a number of signal processing devices including two mixers, two effects devices and a key store. Video inputs are supplied from time base controllers (102-108). The matrix comprises a plurality of dedicated buses and each processing device selects an input from one of a number of buses and returns an output to a different bus where it can be selected for further processing by a different device.

18 Claims, 5 Drawing Sheets

VIDEO SIGNAL PROCESSING SYSTEM ARCHITECTURE

CLAIM OF PRIORITY

Applicant hereby claims priority under 35 USC § 119 to UK Patent Application Ser. No. GB9020539.4 filed in the United Kingdom on Sep. 20, 1990.

FIELD OF THE INVENTION

This invention relates to video signal processing and in particular to television production and post-production systems.

BACKGROUND TO THE INVENTION

An edit suite used in television production and post-production systems will typically contain a vision mixer, digital video effects unit (DVE) and edit controller. Additionally a routing switcher, color corrector and an assortment of other processing devices may well be made available.

Often each of these products will have been produced by different manufacturers. Although every attempt will have been made by these manufacturers to ensure conformity to industry standard protocols and interfaces, some non-conformity is inevitable in order to extract optimum performance and functionality from a particular device.

This non-conformity often causes problems for operators and engineers working with the system. An operator will have to learn the operating style of each individual device and the best way to communicate between devices. An engineer may have to address timing problems and interface protocols requiring a great deal of communication with individual manufacturers.

Several manufacturers have recognised the problem and have begun to produce products which are designed to work together.

Figure 1:
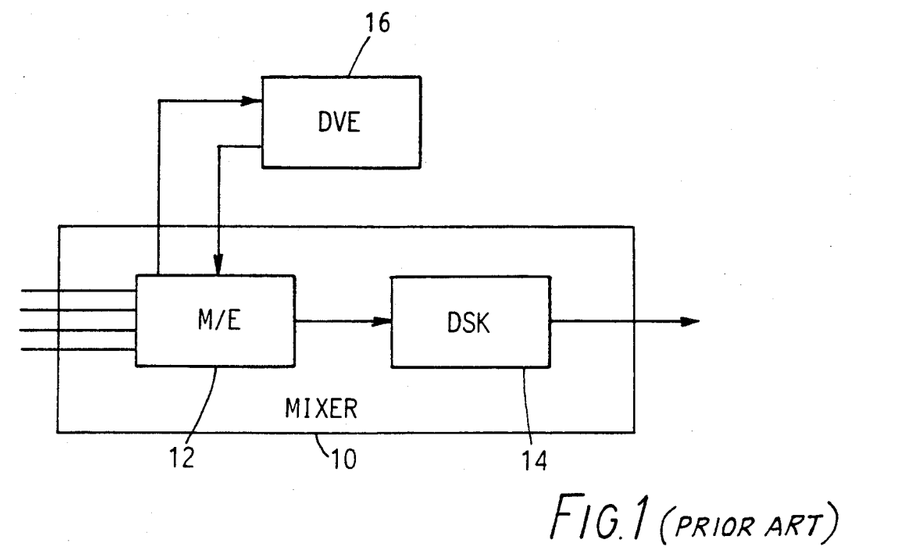
FIG. 1 is a block diagram of prior art edit suite architecture.

FIG. 1 shows the traditional layout of a mixer and digital effects unit which is used in some recent units. In this figure a mixer 10 comprises a mix-effects device (M/E) 12 and a down stream key (DSK) 14. Primary inputs are taken into the mixer where they may be mixed, wiped or keyed together. A dedicated loop (usually only one) provides an exit and re-entry system allowing a primary source to be manipulated by the separate digital effects device (DVE) 16 and recombined within the mix-effects without any appreciable timing or communication difficulties. The output of the mix effects and/or pgm/pst bus is then put through the downstream key 14 which is the last section of processing in the chain and is generally used for the addition of captions or credits. This approach of FIG. 1 works well, however, it does introduce some constraints which have been accepted in the industry but which apply limitations. For example, signal processing through the system takes place in a very structured way.

The complexity of the system obviously depends on the particular choice of mixer and digital effects device combination. Some very powerful systems can deal with up to 10 layers of video in a single pass and may well command a price tag of around 250,000. However, very often even these very powerful systems will only be required to produce a composite of 4 or 5 layers. The extra functionality being required due to the inflexible architecture and timing problems inherent in such a system.

Such systems can be wasteful of circuitry, as a good deal of built in redundancy is required to overcome the inflexibility of this very structured architecture. Some installations have made these systems work extremely well with the aid of external matrixes and processing devices. However, those are in the minority.

The inflexibility of the prior art can be appreciated by considering a situation where a primary input was fed to M/E 12 and external key and external fill applied followed by manipulation in DVE 16.

SUMMARY OF THE INVENTION

The present invention aims to overcome the limitations and disadvantages of the prior art as discussed above.

The invention provides a system which integrates the mixer and digital effects device sections of the edit suite. This solution avoids the need for complex interfaces between these two pieces of equipment. Furthermore, a system is provided which has an integral routing matrix which enables traditional processing problems experienced with the prior art to be overcome and ensures a high degree of flexibility in routing.

This invention is defined more specifically by the claims to which reference should now be made.

The advantages of flexibility is achieved as a result of the central processing system. This preferably conforms to the CCIR601 4:2:2:4 format which yields a high level of transparency for the processing of video and layer signals.

A preferred embodiment of the invention provides a system in which the bus structure is adopted to enable each processing block to communicate its output to the input of the other blocks within the system. Preferably each of the blocks is built on an individual PC board and shares a common interconnected backplane with the other PC boards containing other system blocks.

An embodiment of the invention has the further advantage that each device, on its own PC board, can select which digital video inputs it processes (for example mixes), and then send the resultant signal back to a different bus on the backplane. This processed signal can then be selected for further processing by different device.

Although the actual processing performed by any one device is similar to that performed in the prior art, a system embodying the invention can have significant cost savings resulting from using common circuitry where possible and the overall operation of the system is much more simple. Picture quality is preserved by keeping the signal in digital format rather than processing through A to D and D to A converters required with many of the existing devices.

The invention also provides a method of color correction in which a transfer curve is calculated by a system processor from a user controlled input and the curve is written into a memory in the luminance path to create a color balance correction.

DESCRIPTION OF THE DRAWINGS

An embodiment of the invention will now be described with reference to the accompanying drawings, in which.

DESCRIPTION OF PREFERRED EMBODIMENT

Figure 2:
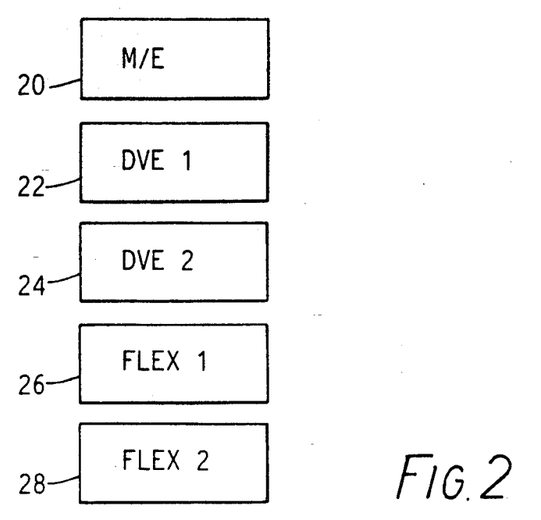
FIG. 2 is a block diagram of the architecture of an embodiment of the invention.
Figure 4:
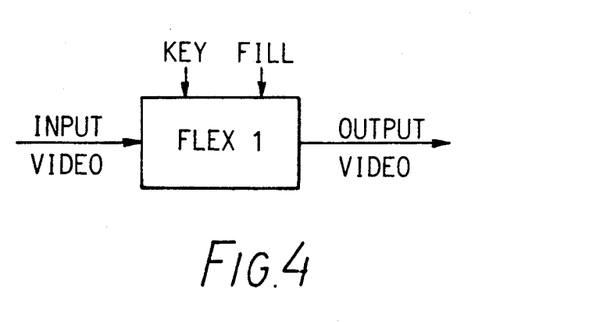
FIG. 4 is a block diagram of one of the flex keys of FIG. 1, showing inputs and outputs.

The system of FIG. 2 comprises five separate elements, a mix-effects unit (M/E) 20, first and second digital video effects units DVEs 22 and 24 and first and second flex key 26, 28. The mix-effects and DVE units are similar in principal to those used in the prior art. The flex keys are analogous to the DSK 14 of the prior art, however their position within the system is not rigid. The flex keys take a background video signal to which a key and fill signal is applied. These key and fill signals may be generated by external character generators such as manuscript or floating point. This operation is illustrated in FIG. 4. The flex keys may be introduced into the system at any point, for example before or after the DVE's, up-stream, midstream or downstream. Thus, as will become clear from a detailed examination of FIG. 6 in due course, the architecture is inherently flexible and does not suffer from the limitations of the prior art.

Figure 3:
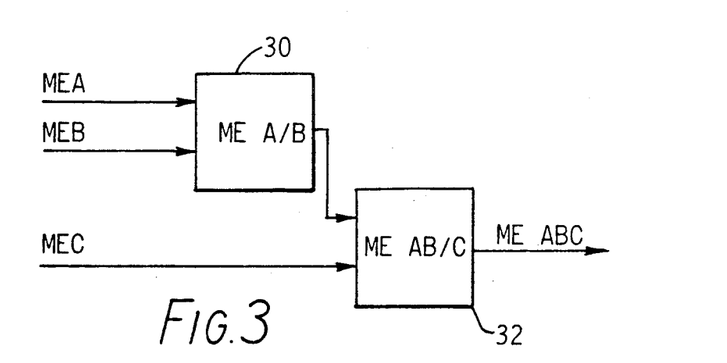
FIG. 3 is a block diagram of the mix-effects device of FIG. 2.

The processing performed by any one of the M/E, DVE's and FLEX's of FIG. 2 is similar to that of the prior art. For that reason, no further description of their composition is necessary. However, it should be appreciated that M/E unit 20 is a one and a half level device as can be seen from FIG. 3. The unit has three inputs, MEA, MEB and MEC and a single output. The first two inputs MEA and MEB are mixed or processed as required in a first mixer effect unit 30 and the output mixed and processed with the third input MEC in a second mix-effects units 32 to produce the output signal ME ABC.

Figure 5:
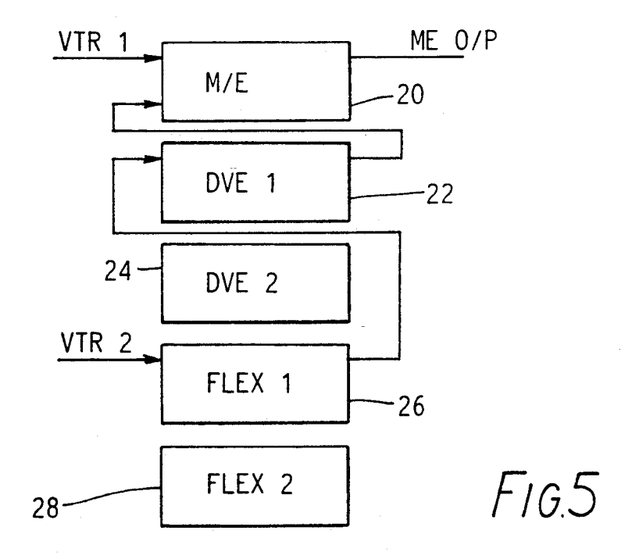
FIG. 5 is a similar block diagram of FIG. 2 showing how the system may be configured for a specific operation.
Figure 6A:
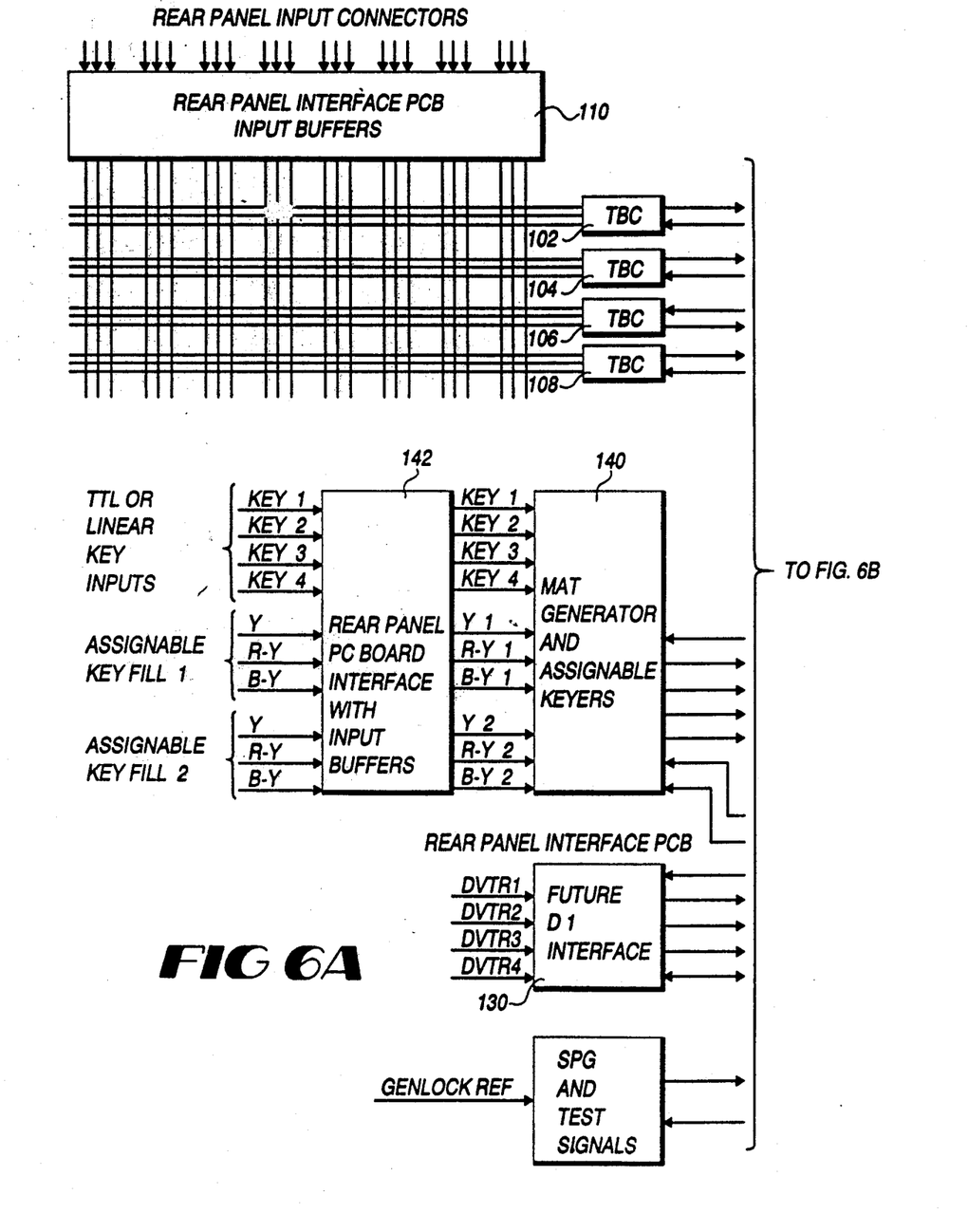
FIG. 6 shows in more detail how the elements of FIG. 2 are configured.
Figure 6B:
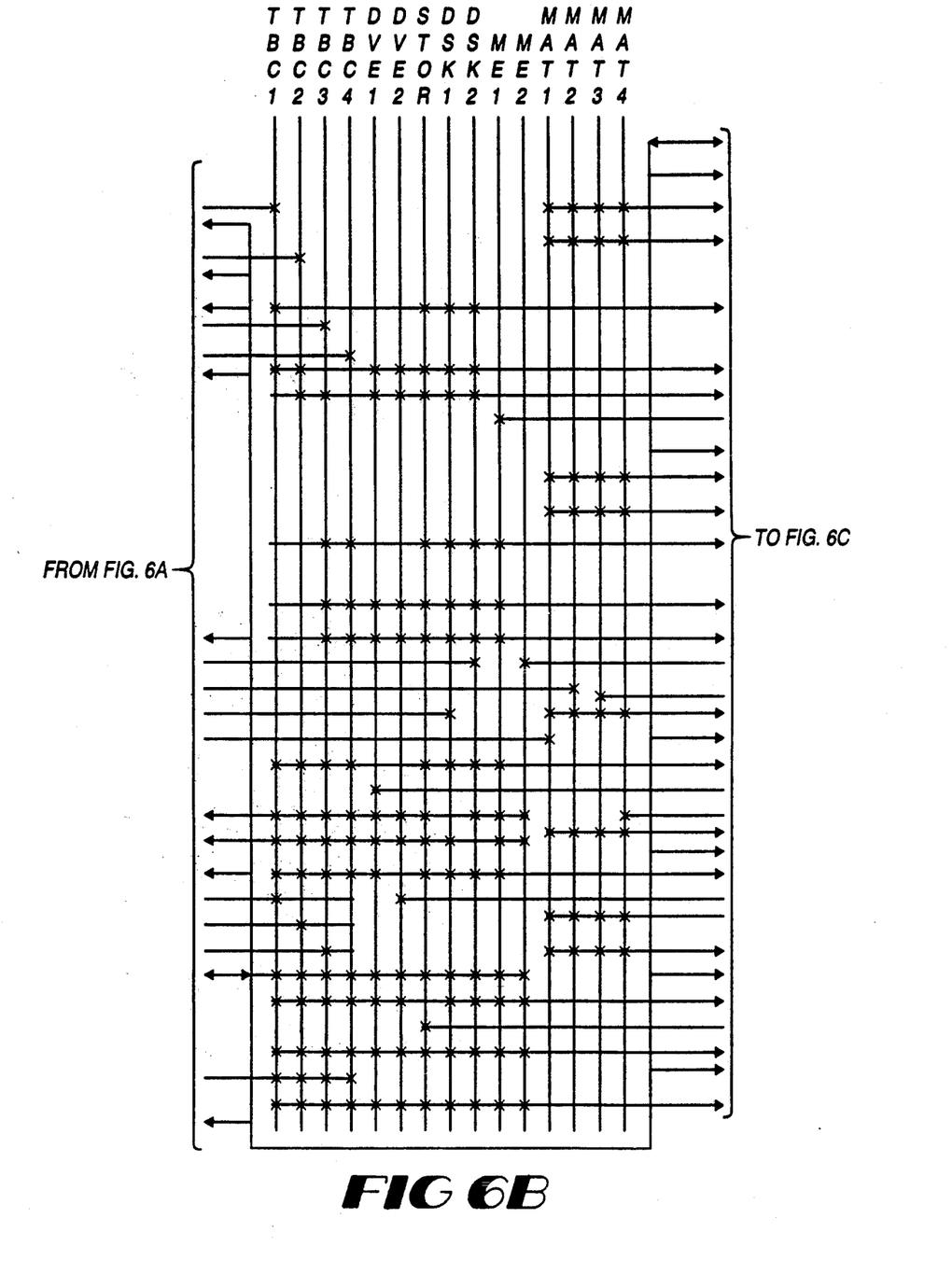
Figure 6C:
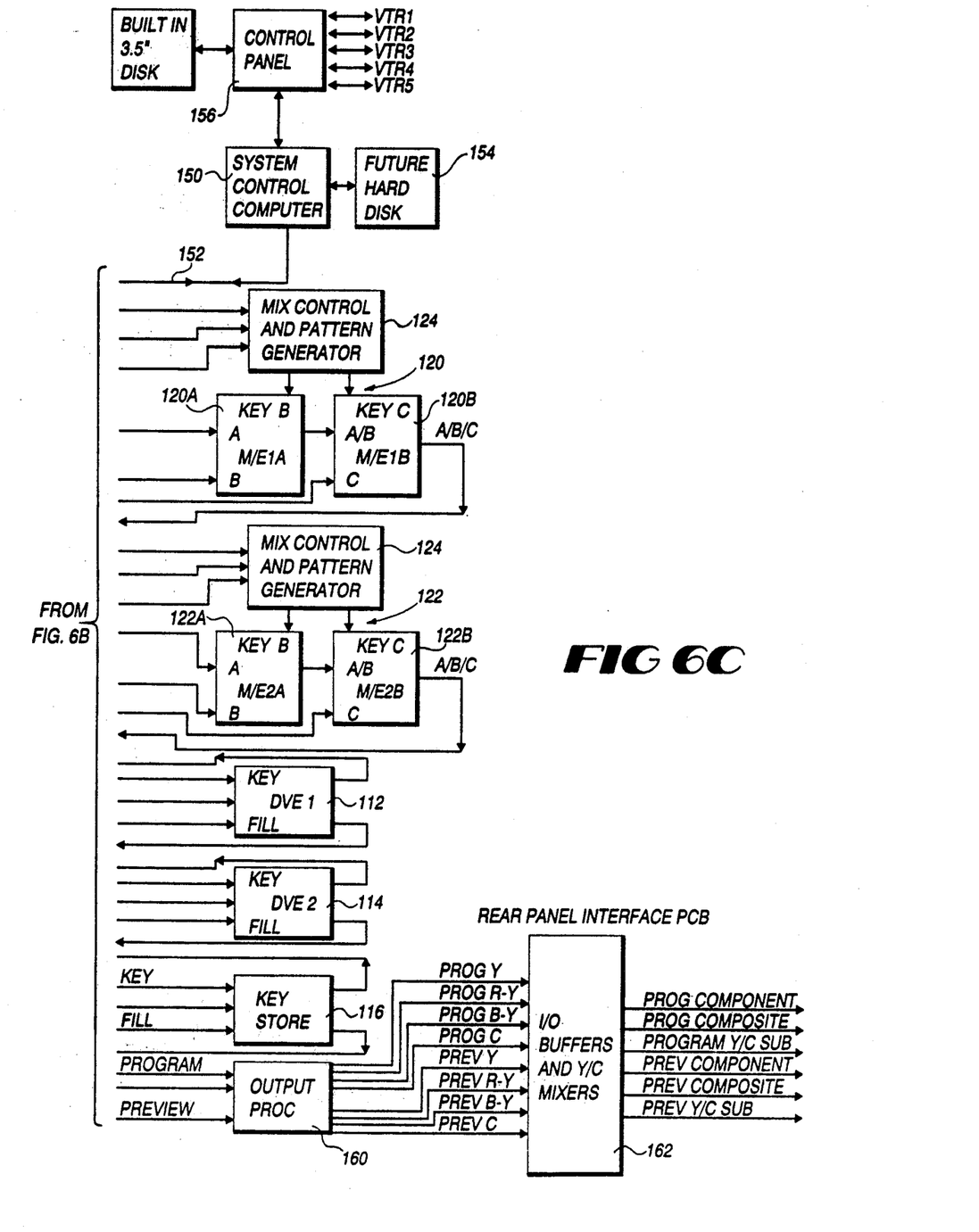

Referring back to FIG. 5, the system shown achieves flexibility of routing by the inclusion of a digital matrix within the unit. This matrix is illustrated in FIG. 6 and has the effect of turning the edit suite inside out. Thus, the timing problems that are present in the prior art that result from sources being re-routed in an n external matrix and then re-entered are obviated.

Consider now the problem posed earlier with respect to the prior art, in which a primary input, to which an external key and external fill are applied followed by manipulation in a digital effects device. The realisation is shown in FIG. 5. The primary input (VTR 1) is fed into the mix effects bank while a secondary input (VTR 2) is fed into flex key 1 (26). The output of flex key 1 is then fed into a digital effects channel (DVE 1) 22 with the subsequent output being fed into M/E 20. The output of M/E 20 is VTR 1 as the background with a flying VTR 2 with captions laid over VTR 1.

Typically, a pair of vision mixers, dual video effects generators, A to D convertors (ADC) and color correctors are each provided on an individual PC board and share a common backplane. A microprocessor communicates instructions to each of the boards on a standard VME bus.

Two additional connectors on each board communicate several simultaneous digital video signals to each other at the standard rate of 27 MHz. This bus structure communicates the outputs of each board to the inputs of every other board that uses digital video inputs. The ADC boards are treated differently and receive several analog inputs from a TBC I/O board that also puts analog signals on a limited part of the backplane.

The microprocessor instructs each board as to which signals to select from the backplane and on each step of the processing by addressing a board slot and registers or memories on that board. These registers and memories are then loaded from the processor with digital words which perform specific tasks on that particular board. Several registers may be loaded on several different boards to perform several tasks simultaneously for a special video effect. In this way the processor controls the vision mixer, digital video effects, ADC's color correctors, and outing selectors simultaneously for a single complexed effect.

Each board has pipeline delay devices on each its inputs to compensate for the accumulative delay or lack of same dependent upon how many boards the selected signal has been through and the delay introduced by each board. The processor keeps track of the routing of each signal, calculates the accumulated delay of every signal and then instructs each board on how to compensate for each particular signal routing. This is done by addressing and loading the delay control registers on every input of every board with data words so that every signal on every board is properly timed. This is necessary in this system because there are a large number of different digital video signals on the backplane. Some of these signals may pass through up to six different delays while others may pass through 0 to 5 delays. The number of combinations is very high but the processor is programmed to calculate all of the delay compensation requirements during every video field so that the system routing can be programmed to change drastically every video field, if required.

The system configures several different video processing boards on a backplane in such a way that each board can select inputs from several different buses, process these signals and put them back on the bus for further processing. The system gives more flexibility and more powerful utilization of each individual element of the system than previously achieved with any other technique. Also, this flexibility gives benefits that can only be attained by much larger accumulation of much more expensive equipment. Furthermore, the nature of the system gives it the capability to store the instructions of routing, mixing, wiping of a pattern or keying signal, digital effects instructions of size, rotation in 3D space, direction of movement, rate of movement, digital trails or sparkles, mosaic patterns, posterization and solarization, ADC input selection and format selection, digital color correction, and video processing values simultaneously for each and every effect in an editing sequence. This makes it possible to preview, run, edit and achieve edit sequences with more detail and greater ease than present equipment.

In FIG. 6, the backplane is indicated generally by reference 100. The backplane has 15 buses each of which are dedicated as follows:

TBC 1-4: are dedicated buses each of which receive an input signal from a correspondingly numbered time base controller TBC 102, 104, 106, 108. The time base controllers receive inputs via input buffers 110 and provide digital outputs to the buses TBC 1-4. As an alternative, TBCs 102-108 may be replaced with analog-to-digital convertors.

DVE 1-2: are the two buses which communicate, respectively, with DVE1 112 and DVE2 114. Both DVE's 112 and 114 can take fill inputs from any one of the four TBC buses 1-4, and key signals from any one of buses MAT 1-4.

STOR: is a bus which corresponds to keystore 116. The keystore 116 is a framestore device in which pictures may be manipulated by external keys or fill signals as-shown.

DSK 1,2: are the two flexkey buses referred to previously. The DSK key may be applied at any point in the signal processing path.

ME 1,2: are the two mixer/edit buses and correspond to the mix/edit units 120, 122. Only one mix/edit unit is necessary and each comprises a pair of mixers 120 A,B, 122 A,B, as described with reference to FIG. 3. In each case the mixing is controlled by the system computer 150 which applies most of the wiper and other edit functions. However, some controls may be supplied directly from a mix control and pattern generator 124. One example would be a circular wipe which is a complex pattern to apply.

MAT 1-4: The final four buses are external mat buses on which external keys are applied. As can be seen, the key inputs of the keystone, DVEs, and mix/edit units are taken from a selected one or ones of these buses.

In addition to receiving analog input signals through TBCs 102-108, provision is made for 3 digital inputs which are placed onto TBC 1, 2, or 3, respectively via digital interface 130. A fourth digital input may be used and placed on any selected bus, with the exception of the four MAT buses.

Keys may be put onto the flexkey buses DSK 1, 2 and two of the MAT buses MAT 1, 2 via a mask generator and assignable key device 140. This device takes four key signals and two sets of luminance and color difference signals from external inputs via an interface 142 provided with input buffers. The final output is processed into a number of video formats by processors 160 and then passed to an output buffer 162 at which outputs are available in component (RGB), composite, or Y/C sub carrier form.

The overall system is controlled by system computer 150. The computer is connected by VME bus 152 to all the hardware units described and also to a hard disk memory 154. The user controls the system from control panel 156. The control panel interfaces with four video tape inputs VTR1-4 and enables the user to select a variety of keys and also to configure the hardware as required. For example, the key input to DVE1 is selected from any one of MAT 1-4 and the fill input from any one of TBC 1-4, STOR, DSK 1, 2 or ME1. The output from DVE1 is put onto the DVE1 bus and can be picked up as an input to, for example, either of the M/E devices, DVE 2 or the key store.

The control panel 156 uses, for example, an electroluminescent display which is surrounded by soft keys. The software is structured such that all commonly used menus are no more than one layer or one push of a button away. All menus give a current status indication and can include relevant information about other menu screens. As users get to know the device, they will be able to program frequently used sequences of button presses for use as macro commands, which can be recorded on floppy disk.

Thus, it will be appreciated that the embodiment described provides a very flexible post production system in which the operator can decide the processing path without being constrained by an inflexible system architecture.

The system can store a number of keyframes. A keyframe is a snap-shot of how the control panel is set up at any given time. A sequence of keyframes, for example 25, can be stored as an event. Any number of events can be stored on disk or elsewhere for future use.

The system also provides a digital color correction technique which uses a processor to calculate a transfer curve by reading an operator's input from a shaft encoder, pot, fader, or joystick and writing that transfer curve to a memory in the luma path to create a color balance correction. The color corrector may be included in the TBCs 102-108 of FIG. 6. This technique is very simple and low cost in hardware but gives very powerful color correction by using an available processor. This circuit and software allows the user to set color black balance, white balance, and gamma curves from a menu and continues to add new correction values to the old ones until the operator is satisfied with the result. The processor can recalculate the correction curves based on a simple set of coefficients and load them to the color correction memory during each vertical interval, if required. The chroma correction value derived from this method is then added to the multiplexed chroma path. In this system two sets of correction values are used or the R-Y and B-Y chroma vector sets are time multiplexed out of memory by using a clock equal to the R-Y/B-Y rate as an address bit. The video keyer and key shape generator are unique to the system described. A key shape generator (key generator) is used to control a pair of digital multipliers. The key signal causes one of the multipliers to reduce the level of the background video signal, while the other multiplier increases the level of the foreground signal. This is a linear process so the edges of the keying signal are not quantized to the sample rate of the video. The process must obey the nyquist criterion of a minimum of two samples to define a rising edge on a signal. It is sometimes necessary to use a small portion of a video signal to create a usable keying signal. The portion of the signal near video black or white level may be noisy, or the scene may have uneven lighting to create a tilt on the video waveform. Therefore, the signal may have to be amplified and clipped at both ends of the amplitude scale. In the keyer, a fixed clip level is created using two diodes wired in parallel with emitter to collector and collector to emitter. A variable gain amplifier precedes the diode clipper so that the percentage of clipping can be controlled. DC control of the amplifier is used to set the video signal that is within the linear portion of the diode clipper. A filter follows the clipper to limit the risetime of the signal to 5 MHz. an amplifier follows the filter to amplify the signal back up to slightly exceed the linear range of the analog to digital converter. In this way, a digital keying signal is created that does not produce unwanted aliasing artifacts when used to create digital video key effect.

I claim:

1. An integrated digital video effects device and mixer system, comprising:
a plurality of signal processing devices for processing one or more inputs, the signal processing devices including a mixer and a video effects device, a system controller for selectively and independently controlling the signal processing devices and for providing an output, and a routing matrix interconnecting the processing devices and configurable by the system controller to process the inputs through the processing devices in any desired sequence of the processing devices.

2. A system according to claim 1, wherein the routing matrix comprises a plurality of buses, each of the buses being dedicated to either one of the inputs or one of the signal processing devices of the system, the output of each of the signal processing devices being coupled to a respective bus, and the input of each of the signal processing devices being selectively couplable to any of the buses corresponding to other signal processing devices and the inputs, whereby the input and the output from one of the processing devices can be both input to another one of the processing devices under control of the system controller.

3. A system according to claim 2, comprising means for selectively placing the input on any one of the input buses.

4. A system according to claim 3, wherein the means for placing the input signals on the input buses includes means for converting analog input signals into digital input signals.

5. A system according to any of claims 2, 3 or 4 wherein the matrix includes at least one flexible key bus and means for applying a key to the bus, the key being applied to the input signal at a point in the processing path determined by the configuration adopted by the system controller.

6. A system according to claim 2, wherein the routing matrix comprises a plurality of signal buses for applying keys to selected ones of the signal processing devices, the keys being generated from an external source or the effects device.

7. A system according to claim 6 wherein the routing matrix comprises a picture store bus onto which signals are placed by a picture store comprising a frame store device, the output of the frame store device also being arranged to place keys on the signal buses.

8. A system according to any of claims 2, 3, 4, or 7 wherein the video effects device comprises first and second digital video effects devices, the routing matrix being arranged such that the output of the first digital video effects device may be selected as an input to the second digital video effects device.

9. A system according to any of claims 2, 3, 4, or 7 wherein the mixer comprises first and second mixing devices, and wherein the routing matrix is arranged such that the output of the first mixing device may be selected as an input to the second mixing device.

10. A system according to any of claims 2, 3, 4, or 7 wherein the routing matrix is arranged on a backplane and each of the signal processing units is mounted on a respective processing board interfaced with the backplane.

11. A combined digital video effects device and mixer system, comprising:
a plurality of signal processing devices including a mixer and a video effects device,
a routing matrix comprising a plurality of buses arranged on a backplane and interconnected with the signal processing devices, and
control means for selecting a particular signal processing device to process one of a plurality of video inputs on the buses of the matrix, for channeling the one of the video inputs through the routing matrix to the particular signal processing device, and for returning a processed signal to a different bus of the matrix, the processed signal being processed by a further signal processing device of the plurality of the signal processing devices.

12. A method of editing video signals in a system in which a plurality of signal processing devices, including a mixer and video effects device, are selectively and independently controlled by a control means and are interconnected through a routing matrix comprising a plurality of buses, said routing matrix being selectively configurable by said control means so that any one of said signal processing devices can be connected to any other one of said signal processing devices, the method comprising:

a) applying a plurality of input video signals to respective buses of the routing matrix,
b) applying one or more keys from the signal processing devices to respective buses of the routing matrix,
c) selecting a first processing device from the plurality of signal processing devices,
d) selecting one of said input video signals for processing by said first processing device,
e) processing said selected one of said input video signals with the selected first processing device to derive a processed signal,
f) returning the processed signal to a different bus from that from which the processed signal was selected, and
g) selecting a second processing device from the plurality of signal processing devices for further processing of the processed signal by the second processing device.

13. A method according to claim 12 comprising selecting a third processing device of said plurality of said signal processing devices and processing the processed signal with the third processing device.

14. A method according to claim 12 or 13 comprising selecting a further input signal of said input video signals for processing said further input signal.

15. An integrated digital video effects device and mixer system for permitting flexible editing of video signals, comprising:
a plurality of signal processing devices for processing one or more inputs, said signal processing devices including a video effects means for processing fill inputs and key signals, a flex key means for applying said key signals, and a mixer means for mixing signals;
a control means for selectively and independently controlling said signal processing devices and for providing an output;
a routing matrix interconnecting said signal processing devices, said routing matrix being configurable by said control means so that said one or more inputs are passed to and from said signal processing devices in any selectable order, said routing matrix comprising a plurality of buses wherein each of said inputs and each of said signal processing devices is dedicated to an exclusive bus; and
means associated with said control means for calculating the accumulated delay of video signals within said system and for instructing each of said signal processing devices as to delay compensation requirements.

16. A system according to claim 1, further comprising a means associated with said controller for calculating the accumulated delay of video signals within the system and for instructing each of said signal processing devices as to delay compensation requirements.

17. A system according to claim 11, further comprising a means associated with said control means for calculating the accumulated delay of video signals within the system and for instructing each of said signal processing devices as to delay compensation requirements.

18. A method according to claim 12, further comprising a means associated with said control means for calculating the accumulated delay of video signals within the system and for instructing each of said signal processing devices as to delay compensation requirements.

* * * * *